United States Patent
Kandasamy et al.

(10) Patent No.: US 9,817,754 B2
(45) Date of Patent: *Nov. 14, 2017

(54) FLASH MEMORY MANAGEMENT (71) Applicant: International Business Machines Corporation, Armonk, NY (US)

(72) Inventors: Madhusudanan Kandasamy, TamilNadu (IN); Randal C. Swanberg, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/986,698

(22) Filed: Jan. 3, 2016

(65) Prior Publication Data
US 2017/0123969 A1    May 4, 2017

Related U.S. Application Data (63) Continuation of application No. 14/930,641, filed on Nov. 2, 2015.

(51) Int. Cl.
*G06F 12/00* (2006.01)
*G06F 12/02* (2006.01)
*G06F 3/06* (2006.01)

(52) U.S. Cl.
CPC ........ *G06F 12/0246* (2013.01); *G06F 3/0611* (2013.01); *G06F 3/0631* (2013.01); *G06F 3/0679* (2013.01); *G06F 2212/1008* (2013.01); *G06F 2212/1024* (2013.01); *G06F 2212/2022* (2013.01); *G06F 2212/72* (2013.01); *G06F 2212/7202* (2013.01)

(58) Field of Classification Search
None
See application file for complete search history.

(56) References Cited

U.S. PATENT DOCUMENTS

| 5,802,554 | A | 9/1998 | Caceres et al. |
| 8,583,868 | B2 | 11/2013 | Belluomini et al. |
| 9,009,396 | B2 | 4/2015 | Nemazie |
| 2010/0223422 | A1 | 9/2010 | Bonella et al. |
| 2012/0173809 | A1* | 7/2012 | Ko ................. G06F 12/0893 711/105 |
| 2013/0019063 | A1* | 1/2013 | Astigarraga ......... G06F 12/126 711/125 |
| 2013/0080693 | A1 | 3/2013 | Kim et al. |

(Continued)

OTHER PUBLICATIONS

Kandasamy et al., "Flash Memory Management", U.S. Appl. No. 14/930,641, filed Nov. 2, 2015.

(Continued)

*Primary Examiner* — Daniel Tsui
(74) *Attorney, Agent, or Firm* — Christopher McLane; Kevin D. Kehe (57) ABSTRACT

Disclosed aspects include managing the access of flash memory by a computer system. A physical memory address space which includes a flash memory portion is established. The flash memory portion may correspond to an input/output memory range. An access request may be detected with respect to the physical memory address space. Using a load-store technique to process the access request, the flash memory portion of the physical memory address space may be accessed.

19 Claims, 4 Drawing Sheets (56) References Cited

U.S. PATENT DOCUMENTS

| | | | |
|---|---|---|---|
| 2014/0095764 A1* | 4/2014 | Schumacher | G06F 12/0246 711/103 |
| 2014/0095769 A1* | 4/2014 | Borkenhagen | G11C 5/04 711/103 |
| 2014/0304460 A1 | 10/2014 | Carlson, Jr. et al. | |
| 2015/0019798 A1 | 1/2015 | Huang | |
| 2016/0246715 A1* | 8/2016 | Ignatowski | G06F 12/0802 |
| 2016/0253123 A1* | 9/2016 | Jacob | G06F 12/0806 711/103 |

OTHER PUBLICATIONS

List of IBM Patents or Patent Applications Treated as Related.
Kandasamy et al., "Flash Memory Management", UK Application No. 1617325A, filed on Oct. 12, 2016, 30 pages.
Patents Act 1977: Combined Search and Examination Report under Sections 17 and 18(3), Intellectual Property Office, Application No. GB1617325.4, dated Apr. 5, 2017, 6 pages.

* cited by examiner

FLASH MEMORY MANAGEMENT

BACKGROUND

This disclosure relates generally to computer systems and, more particularly, relates to the management of flash memory. Managing flash memory may be desired to be performed as efficiently as possible. The amount of data that needs to be managed by enterprises related to flash memory is increasing. As data needing to be managed increases, the need for management efficiency may increase.

Flash memory may be utilized as a memory solution in computer systems due to its relatively low latency and low cost compared to other types of memory. In certain systems, flash memory is utilized as a new storage tier in between DRAM (dynamic random access memory) and a magnetic spinning disk system. In such systems, placing the flash memory in close relation to the CPU (central processing unit) can provide benefits of reduced latency, yet still suffer from the cost of increased CPU path length due to the device driver overhead, block input/output (TO) processing, and other inherent bottlenecks of interfacing to the flash memory as a block storage device. Other solutions include using flash memory as a direct load-store model similar to RAM (random access memory), which shortens the CPU path length but can stall the CPU for each load request as flash latency is much higher than DRAM.

SUMMARY

Disclosed aspects include managing the access of flash memory by a computer system. A physical memory address space which includes a flash memory portion is established. The flash memory portion may correspond to an input/output memory range. An access request may be detected with respect to the physical memory address space. Using a load-store technique to process the access request, the flash memory portion of the physical memory address space may be accessed. Accordingly, aspects may provide efficiency benefits associated with providing direct access to flash for load and store operations without an OS pagefault, reduced CPU cycles, simple management using existing APIs, and performance increases.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to managing the access of flash memory by a computer system. For example, flash memory may be added as an extension to a real memory address space accessible by a central processing unit (CPU) using a physical address. In embodiments, such a configuration may provide the flexibility of using flash as a load-store model for the operating system (OS) or other applications without stalling the CPU for each load-store request. Access to the flash memory may be provided to the CPU and other applications using one or more application program interfaces (APIs), such that the flash memory may be accessible similarly to system random-access memory (RAM).

Flash memory has increasingly become favored as a memory solution in computer systems due to its lower latency compared to magnetic disk and lower cost compared to DRAM (dynamic random access memory). In certain systems, flash memory is utilized as a new tier of memory between DRAM (dynamic random access memory) and a magnetic spinning disk system. In such systems, placing the flash memory in close relation to the CPU (e.g., directly on PCI Express bus or in RAM slots) can provide benefits of reduced latency, but may still incur the cost of high CPU path length due to device driver overhead, block input/output (IO) processing, and other inherent bottlenecks of the operating system interface. Other solutions include using flash memory as a load-store model similar to RAM, which shortens the CPU path length but can stall the CPU for each load request as flash latency is much higher than DRAM. Accordingly, in embodiments, aspects of the disclosure are directed toward a hybrid solution which can provide the benefits of both the load/store and block I/O approach while avoiding the corresponding limitations. This would provide the flexibility of using flash as a load-store model for the operating system and other applications while avoiding the CPU stalling during each load/store request. For instance, the flash memory may be added as an extension to a real memory address space accessible by the CPU using a physical address. Accordingly, such a configuration may provide benefits associated with providing direct access to flash for load and store operations without an OS pagefault, reduced CPU cycles, simple management using existing APIs, and performance increases.

Aspects of the disclosure include a method, system, and computer program product for accessing and managing flash memory. A physical memory address space including a flash memory portion may be established. The physical memory address space may alternatively include a volatile memory of a physically separate computer. Accessing the flash memory may include utilizing a field-programmable gate array attachment. The field-programmable gate array adapter may be used to maintain an adapter cache. In embodiments, aspects of the disclosure include using a device driver to map the flash memory portion of the physical memory address space and an application.

In embodiments, accessing the flash memory may include detecting an access request with respect to the physical memory address space. The access request may include a physical address which directly addresses the flash memory portion of the physical address space. Also, the flash memory portion may correspond to an input-output memory range. In embodiments, in response to detecting the access request, it may be determined that a set of requested data is not in a central processing unit cache. Accordingly, the access request may be detected with respect to the physical memory address space. The access request may then be processed by the field programmable gate array adapter that has been assigned ownership of that physical memory address space. In certain embodiments, the access request may be processed with respect to the flash memory without a virtual memory manager file cache. The access request may be processed with respect to the flash memory without a Least Recently Used (LRU) logic of an virtual memory manager.

In embodiments, in response to processing the access request by the field-programmable gate array (FPGA) adapter, it may be determined that the set of requested data is not in the FPGA adapter managed cache. In response to determining that the first set of requested data is not in the FPGA adapter managed cache, a first interrupt may be established to allow the operating system to undispatch (e.g., remove from a CPU processing queue) an interrupted software thread and dispatch another software thread on the CPU. The set of requested data may be retrieved by the FPGA adapter from the flash memory portion of the physical address space. In response to retrieving the set of requested data from the flash memory portion of the physical address space, a second interrupt may be established to inform the operating system the original interrupted thread may now be redispatched (e.g., added to a CPU processing queue). Other aspects of the invention are directed toward determining, in response to detecting the access request, that the access request is a store instruction. In embodiments, a cache line of the adapter cache may be marked with a cache-line status identifier. If the cache line targeted by the store instruction is already in the cache, or if not but there is a free line available for immediate allocation, the operation may then be processed without an interrupt.

Figure 1:
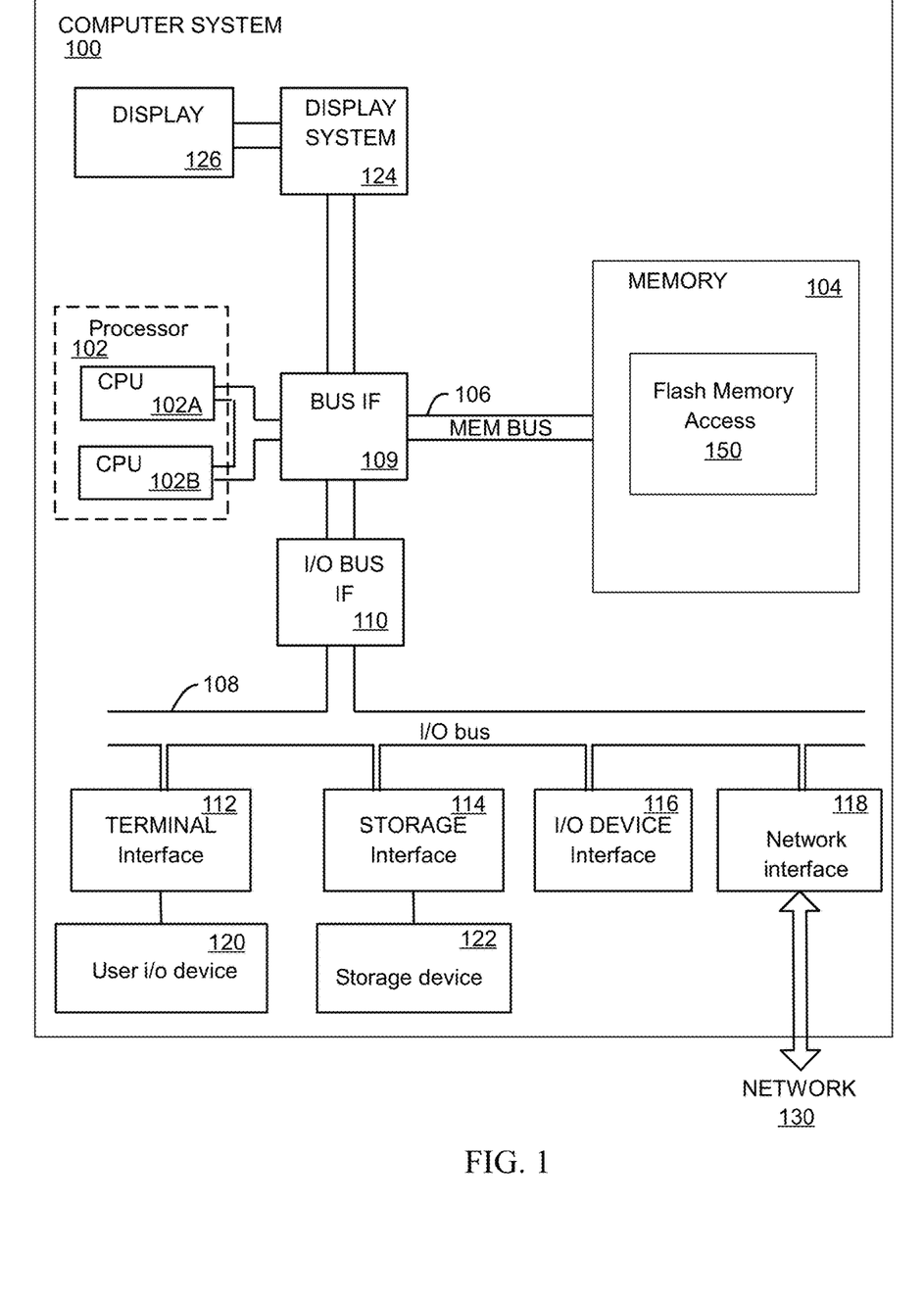
FIG. 1 depicts a high-level block diagram of a computer system for implementing various embodiments of the present disclosure.

Turning now to the figures, FIG. 1 depicts a high-level block diagram of a computer system for implementing various embodiments of the present disclosure, consistent with various embodiments. The mechanisms and apparatus of the various embodiments disclosed herein apply equally to any appropriate computing system. The major components of the computer system 100 include one or more processors 102, a memory 104, a terminal interface 112, a storage interface 114, an I/O (Input/Output) device interface 116, and a network interface 118, all of which are communicatively coupled, directly or indirectly, for inter-component communication via a memory bus 106, an I/O bus 108, bus interface unit 109, and an I/O bus interface unit 110.

The computer system 100 may contain one or more general-purpose programmable central processing units (CPUs) 102A and 102B, herein generically referred to as the processor 102. In embodiments, the computer system 100 may contain multiple processors; however, in certain embodiments, the computer system 100 may alternatively be a single CPU system. Each processor 102 executes instructions stored in the memory 104 and may include one or more levels of on-board cache.

In embodiments, the memory 104 may include a random-access semiconductor memory, storage device, or storage medium (either volatile or non-volatile) for storing or encoding data and programs. In certain embodiments, the memory 104 represents the entire virtual memory of the computer system 100, and may also include the virtual memory of other computer systems coupled to the computer system 100 or connected via a network. The memory 104 can be conceptually viewed as a single monolithic entity, but in other embodiments the memory 104 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 104 may store all or a portion of the various programs, modules and data structures for processing data transfers as discussed herein. For instance, the memory 104 can store a flash memory access application 150. In embodiments, the flash memory access application 150 may include instructions or statements that execute on the processor 102 or instructions or statements that are interpreted by instructions or statements that execute on the processor 102 to carry out the functions as further described below. In certain embodiments, the flash memory access application 150 is implemented in hardware via semiconductor devices, chips, logical gates, circuits, circuit cards, and/or other physical hardware devices in lieu of, or in addition to, a processor-based system. In embodiments, the flash memory access application 150 may include data in addition to instructions or statements.

The computer system 100 may include a bus interface unit 109 to handle communications among the processor 102, the memory 104, a display system 124, and the I/O bus interface unit 110. The I/O bus interface unit 110 may be coupled with the I/O bus 108 for transferring data to and from the various I/O units. The I/O bus interface unit 110 communicates with multiple I/O interface units 112, 114, 116, and 118, which are also known as I/O processors (IOPs) or I/O adapters (IOAs), through the I/O bus 108. The display system 124 may include a display controller, a display memory, or both. The display controller may provide video, audio, or both types of data to a display device 126. The display memory may be a dedicated memory for buffering video data. The display system 124 may be coupled with a display device 126, such as a standalone display screen, computer monitor, television, or a tablet or handheld device display. In one embodiment, the display device 126 may include one or more speakers for rendering audio. Alternatively, one or more speakers for rendering audio may be coupled with an I/O interface unit. In alternate embodiments, one or more of the functions provided by the display system 124 may be on board an integrated circuit that also includes the processor 102. In addition, one or more of the functions provided by the bus interface unit 109 may be on board an integrated circuit that also includes the processor 102.

The I/O interface units support communication with a variety of storage and I/O devices. For example, the terminal interface unit 112 supports the attachment of one or more user I/O devices 120, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 120 and the computer system 100, and may receive output data via the user output devices. For example, a user interface may be presented via the user I/O device 120, such as displayed on a display device, played via a speaker, or printed via a printer.

The storage interface 114 supports the attachment of one or more disk drives or direct access storage devices 122 (which are typically rotating magnetic disk drive storage devices, although they could alternatively be other storage devices, including arrays of disk drives configured to appear as a single large storage device to a host computer, or solid-state drives, such as flash memory). In some embodiments, the storage device 122 may be implemented via any type of secondary storage device. The contents of the memory 104, or any portion thereof, may be stored to and retrieved from the storage device 122 as needed. The I/O device interface 116 provides an interface to any of various other I/O devices or devices of other types, such as printers or fax machines. The network interface 118 provides one or more communication paths from the computer system 100 to other digital devices and computer systems; these communication paths may include, e.g., one or more networks 130.

Although the computer system 100 shown in FIG. 1 illustrates a particular bus structure providing a direct communication path among the processors 102, the memory 104, the bus interface 109, the display system 124, and the I/O bus interface unit 110, in alternative embodiments the computer system 100 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 110 and the I/O bus 108 are shown as single respective units, the computer system 100 may, in fact, contain multiple I/O bus interface units 110 and/or multiple I/O buses 108. While multiple I/O interface units are shown, which separate the I/O bus 108 from various communications paths running to the various I/O devices, in other embodiments, some or all of the I/O devices are connected directly to one or more system I/O buses.

In various embodiments, the computer system 100 is a multi-user mainframe computer system, a single-user system, or a server computer or similar device that has little or no direct user interface, but receives requests from other computer systems (clients). In other embodiments, the computer system 100 may be implemented as a desktop computer, portable computer, laptop or notebook computer, tablet computer, pocket computer, telephone, smart phone, or any other suitable type of electronic device.

FIG. 1 depicts several major components of the computer system 100. Individual components, however, may have greater complexity than represented in FIG. 1, components other than or in addition to those shown in FIG. 1 may be present, and the number, type, and configuration of such components may vary. Several particular examples of additional complexity or additional variations are disclosed herein; these are by way of example only and are not necessarily the only such variations. The various program components illustrated in FIG. 1 may be implemented, in various embodiments, in a number of different manners, including using various computer applications, routines, components, programs, objects, modules, data structures, etc., which may be referred to herein as "software," "computer programs," or simply "programs."

Figure 2:
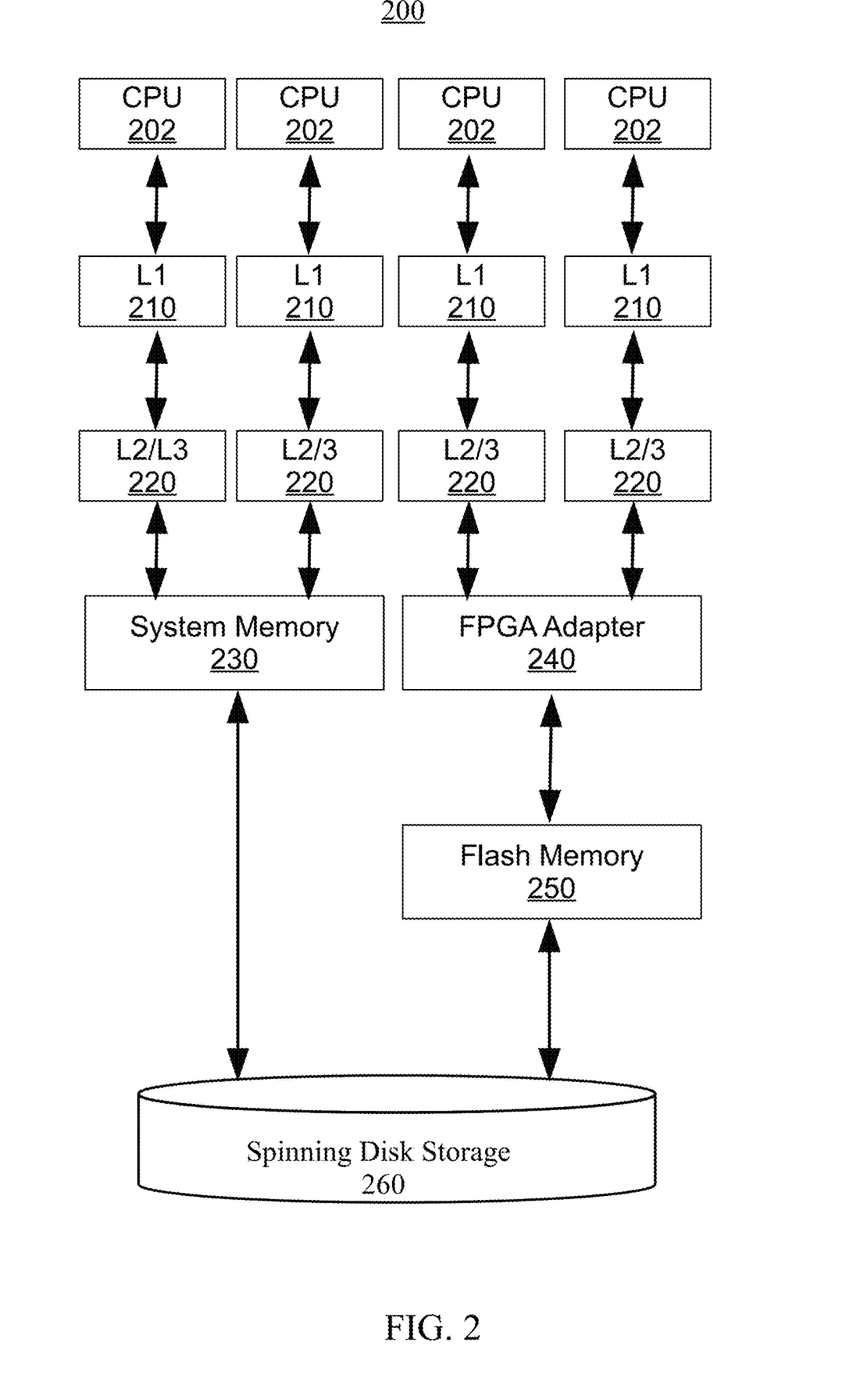
FIG. 2 is a diagrammatic illustration of an example storage hierarchy, according to embodiments.

FIG. 2 is a diagrammatic illustration of an example storage hierarchy 200, consistent with embodiments of the present disclosure. Storage hierarchy 200 may include one or more central processing units 202 (CPUs) in the form of physical or virtual cores, level 1 (L1) cache 210, level 2 (L2)/level 3 (L3) caches 220, system memory 230, a field programmable gate array adapter 240, flash memory 250, and a spinning disk storage system 260. Flash memory 250 may be a flash solid state drive (SSD), flash dual inline memory module (DIMM), or flash Peripheral Component Interconnect (PCI) card. The spinning disk storage system 260 may include one or more hard disk drives or a network of drives configured for data storage. In embodiments, L1 cache 210, L2/L3 cache 220, and system memory 230 may be hardware managed layers managed by CPUs 202. For instance, CPUs 202 may manage data spills and retrieval operations between L1 cache 210 and L2/L3 caches 220 and system memory 230.

Aspects of the disclosureare directed toward a hybrid solution for providing direct access to flash memory without the over head of the device driver, OS page fault, and need to query the CPU for each load/store request. In embodiments, the flash memory may be added as an extension to a real memory address space. The CPU may directly access the flash memory using a physical address. In embodiments, access to the physical address of the flash memory may be managed by one or more application programming interfaces (APIs) configured to facilitate data synchronization and remote access between the CPU and the flash memory address. As shown in FIG. 2, aspects of the disclosure are directed toward utilizing a field programmable gate array (FPGA) adapter 240 programmable to operate the designated APIs for flash memory access. The FPGA Adapter 240 may be accessible by the CPU 202 to facilitate access to the flash memory 250. In embodiments, the FPGA adapter 240 may include another level of cache (e.g., L4 cache, adapter cache) configured to maintain data and instructions frequently requested by the CPU. Accordingly, as described herein, such a configuration may have benefits associated with decreased CPU path length, reduced latency, and fewer CPU cycles.

Figure 3:
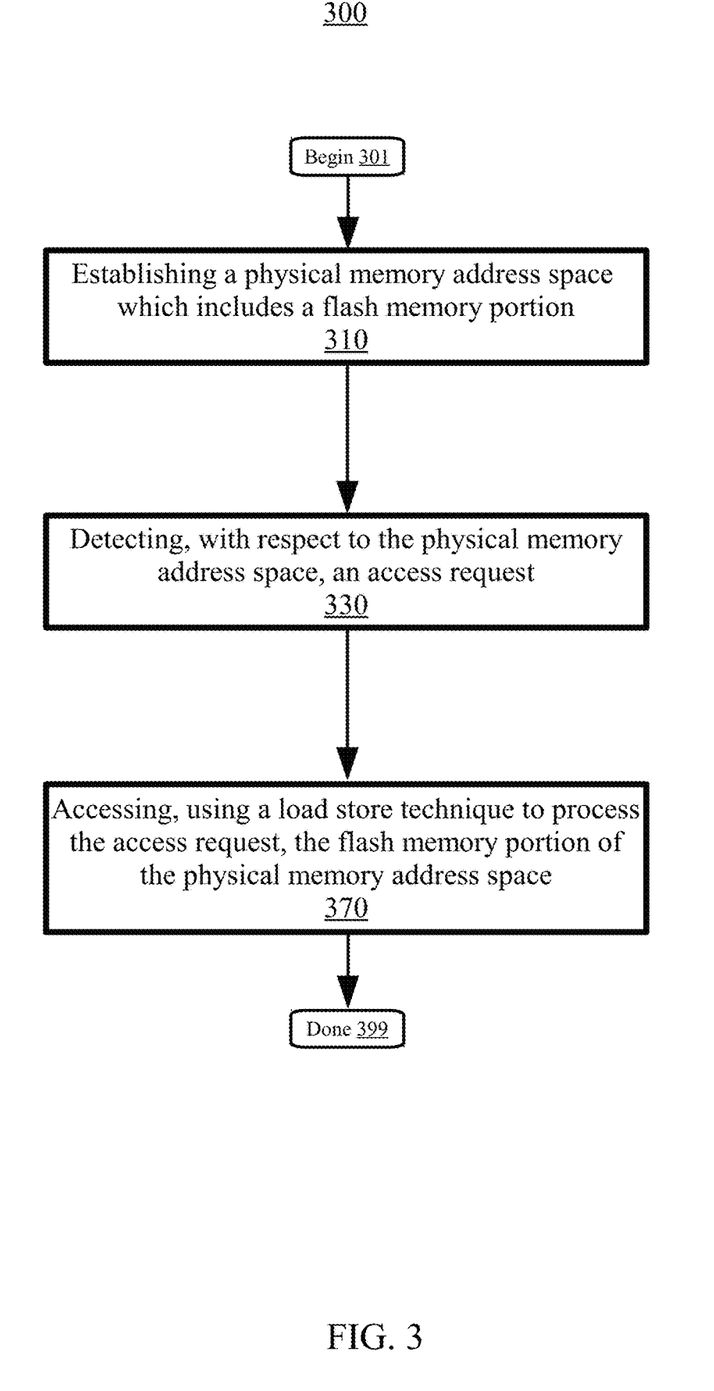
FIG. 3 is a flowchart illustrating a method for managing access to flash memory, according to embodiments.

FIG. 3 is a flowchart illustrating a method 300 for managing access to flash memory, according to embodiments. Aspects of FIG. 3 are directed toward a method 300 for providing direct access to flash memory through a physical memory address space. Such a configuration may allow applications to avoid multiple layers of software access controls, and access flash memory in a similar fashion to DRAM (dynamic random access memory). The method 300 may begin at block 301, and include an establishing block 310, a detecting block 330, and an accessing block 370. The method 300 may terminate at block 399.

At establishing block 310, the method 300 may include establishing a physical memory address space which includes a flash memory portion. In embodiments, the physical memory address space may be a memory address represented in the form of a binary number on the address bus circuitry to facilitate access to a particular storage cell of flash memory (e.g., by a data bus). The physical memory address space may include an input-output memory range that corresponds to one or more storage cells of the flash memory. In embodiments, establishing the physical memory address space may include designating, distributing, allocating, or otherwise selecting a range of discrete addresses on the address bus circuitry and assigning them to a series of storage cells of the flash memory. Other methods of establishing the physical memory address spaces for the flash memory portion are also possible.

At detecting block 330, the method 300 may include detecting an access request with respect to the physical memory address space. The access request may be an inquiry or query for a specific set of data (e.g., set of requested data). The set of requested data may be textual, audio, or visual information stored on flash memory. The access request may include a read operation configured to extract data from a specified address in the flash memory, a write operation configured to save data to a specific memory address, or both. In embodiments, the access request may be a scheduled or programmed request carried out by the operating system as part of a system task or other process. For instance, in response to the operating system performing a firmware update, an access request may be submitted to the flash memory requesting an address space to store data related to the new firmware version. In embodiments, the access request may be initiated by a user or system administrator. For example, a user may perform a system search for a particular file (e.g., history report). In response to receiving the search request of the user, the method 300 may include querying the flash memory to retrieve the requested file. Other methods of detecting the access request are also possible.

At accessing block 370, the method 300 may include using a load/store technique to process the access request and access the flash memory portion of the physical memory address space. Generally, the load/store technique may be configured to manage the procedures of saving data to the flash memory storage as well as extracting data from the flash memory. More particularly, the load portion of the load/store technique may be configured to copy a set of target data (e.g., the set of requested data) from the flash memory into a register (e.g., processor register of the CPU). The store portion of the load/store technique may be configured to copy the target data from the register into the flash memory portion. As an example, in response to a user search for a particular file (e.g., access request for a set of requested data), the method 300 may analyze the request from the user, and query the flash memory address space to locate the desired data. The method 300 may perform a load operation to copy the desired data from the flash memory into a CPU register and provide the data to the user. In response to detecting a user edit to the data, the method 300 may perform a store operation to copy the edited data from the CPU register to the flash memory. Further aspects of the disclosure are directed toward using a load/store technique having CPU path length below a CPU path length threshold (e.g., fewer CPU instructions may facilitate faster performance.) Other methods of performing the load/store technique are also possible.

Figure 4:
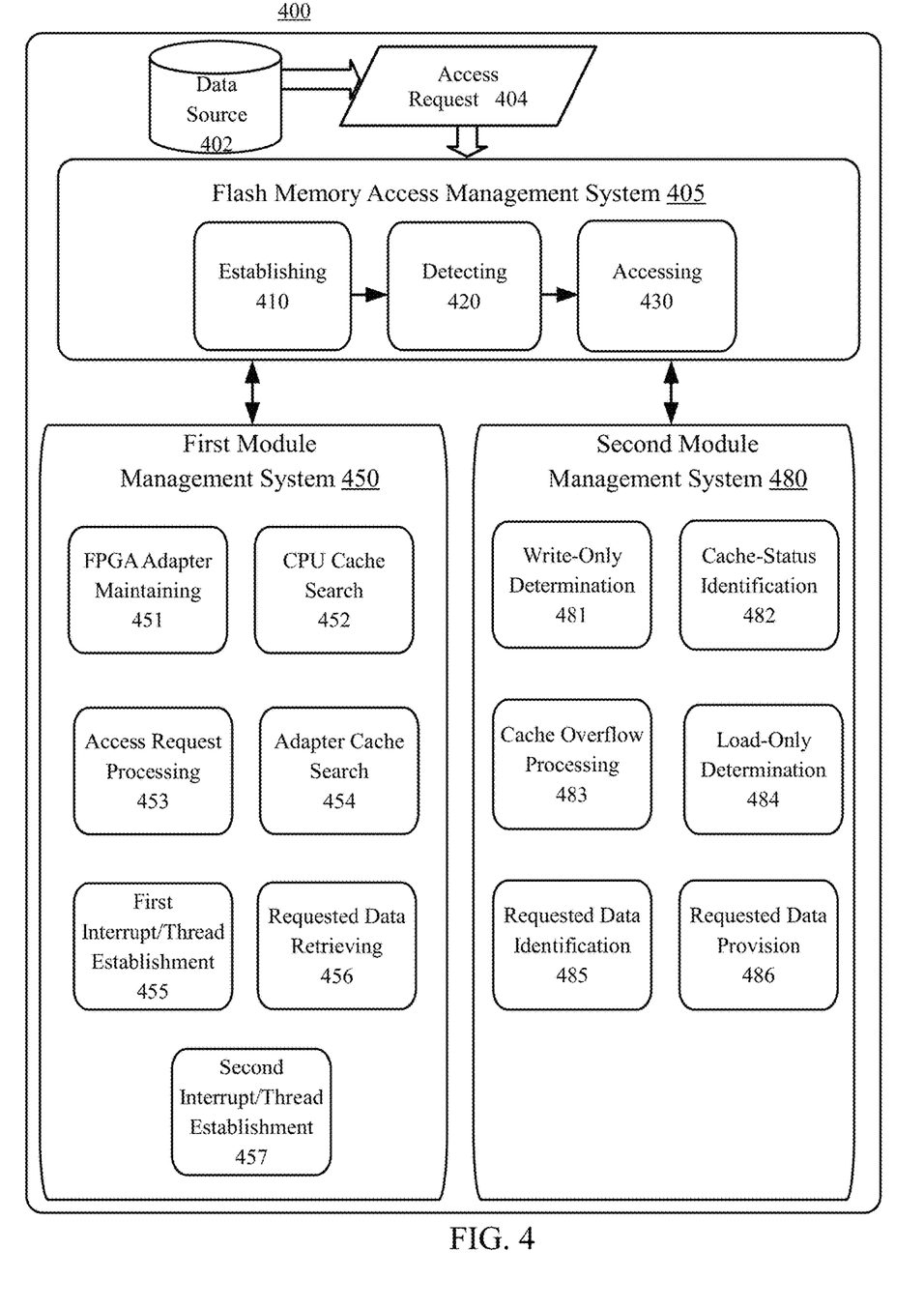
FIG. 4 shows an example system for implementing a method for managing access to flash memory, according to embodiments.

FIG. 4 shows an example system architecture 400 for implementing a method for managing access to flash memory, according to embodiments. Aspects of the system architecture of FIG. 4 are directed to providing direct access to flash memory through a physical memory address space. Such a configuration may allow applications to avoid multiple layers of software access controls, and access flash memory in a similar fashion to DRAM (dynamic random access memory). The system 400 may include a data source 402, an access request 404, a flash memory access management system 405, an establishing operation 410, a detecting operation 420, an accessing operation 430, a first module management system 450, a second module management system 480, and a number of modules, sub-modules and other operations configured to facilitate aspects of flash memory access.

As shown in FIG. 4, the system architecture 400 may include a data source 402. The data source 402 may include a device such as a computer, tablet, smart phone, storage device, real-time data feed, databases, or other storage means configured to maintain data and information. The data in the data source 402 may be either structured or unstructured, and organized using one or more of a number of file formats (e.g., plain text, XML, SQL, Perl DBM). As an example, the data source 402 may include a computer device with a human interface used to receive user input to the flash memory access management system 405. In embodiments, the access request 404 may be transmitted from the data source 402 to the flash memory access management system 405. As described herein, the access request 404 may be a query or command indicating an inquiry (e.g., read or write request) for a specific set of data. As an example, in certain embodiments, the data source 402 may be a computing device, and the access request 404 may include a request by a user to open an executable file to run a program. Other types of data sources and access requests beyond those described explicitly herein are also possible.

As described herein, the flash memory access management system 405 may include an establishing operation 410. The establishing operation 410 may include designating, distributing, allocating, or otherwise selecting a range of discrete addresses on the address bus circuitry and assigning them to a series of storage cells of the flash memory. Accordingly, read/write requests and other operations may access the flash memory through the designated physical address. As shown at FPGA adapter maintaining module 451, aspects of the present disclosure are directed toward maintaining a field-programmable gate array adapter configured to directly interface with the physical address space of the flash memory. Generally, the FPGA adapter may be an array of programmable logic blocks configured to execute one or more APIs for facilitating data synchronization and remote access between the CPU and the flash memory address space. In embodiments, the FPGA adapter may be configured to have an adapter cache. The adapter cache may be an additional level of cache storage (e.g., L4) configured to maintain data and instructions requested by the CPU.

In embodiments, the flash memory access management system 405 may include a detecting operation 420 configured to detect an access request with respect to the physical memory address space. Generally, detecting the address request may include identifying, recognizing, ascertaining, or determining that an inquiry or query for a specific set of data (e.g., access request) is directed toward the physical memory address space of the flash memory. The access request may include a read operation configured to extract data from a specified address in the flash memory, a write operation configured to save data to a specific memory address, or both. In response to detecting the access request, the CPU cache search module 452 may be configured to perform a search of the CPU cache to determine whether or not the set of data requested by the access request is available. In the event that the requested data is available in the CPU cache, it may be extracted and provided in response to the access request. In certain embodiments, the CPU cache search module 452 may be included in the CPU, and be communicatively connected to the FPGA adapter.

Aspects of the disclosure are directed toward the recognition that, in certain situations, the requested data may be stored on the flash memory portion and may not be available in the cache of the CPU. Accordingly, in response to detecting the access request for the flash memory, the flash memory access request processing module 453 may be used to process the access request. Processing the access request may include analyzing or performing one or more operations on the access request to ascertain what data is requested, where in the flash memory the data is stored (e.g., address space), and ascertain other characteristics about the access request. Processing of the access request may be carried out using the flash memory and the APIs of the FPGA adapter. Further, aspects of the disclosure are directed toward processing the access request without using a virtual memory manager file cache for Least Recently Used (LRU) logic of an operating system. As these operations can be carried out using the flash memory and the FPGA adapter, processing of the access request can be completed without placing extra burden on the main memory and CPU, reducing CPU cycles. The load/store technique may also provide benefits associated with reduced CPU path length (e.g., the number of discrete code instructions used to accomplish a particular objective).

In embodiments, in response to processing the access request by the field programmable gate array adapter, the accessing module 430 of the flash memory access management system 405 may be configured to use a load-store technique to access the flash memory portion of the physical memory address space. Generally, the load/store technique may be configured to manage the procedures of saving data to the flash memory storage as well as extracting data from the flash memory. Accordingly, at accessing module 430 the flash memory portion may be accessed in order to perform a load or store operation (e.g., based on the access request detected at detecting module 420).

As described herein, accessing the flash memory portion may include using the adapter cache search module 454 to search the adapter cache of the FPGA adapter for the set of requested data specified by the access request. In the event that the requested data is found in the adapter cache of the FPGA adapter, it may be provided in response to the access request. In the event that the requested data is not located in the adapter cache of the FPGA adapter, the module 455 may be configured to establish both a first interrupt in response to failing to find the requested data in the adapter cache. Aspects of the disclosure relate to the recognition that, in situations where the requested data is not found in the adapter cache, it may be desirable to query other memory locations (e.g., flash memory) for the requested data. As such, establishing the first interrupt for the CPU may reduce idling time spent on the load/store request (e.g., time that could be used querying other locations or on other tasks). Accordingly, the first interrupt may be a command to the CPU to pause or terminate an operation (e.g., the load/store request) to reduce CPU idling time.

At requested data retrieving module 456, aspects of the disclosure are directed toward retrieving the set of requested data from the flash memory portion of the physical address space. Retrieving the set of data may include using one or more query algorithms or techniques to search the data stored within the flash memory, and identifying the data specified in the access request. The requested data may be fetched from the flash memory space and provided in response to the access request. In embodiments, at module 457, a second interrupt may be established in response to retrieving the set of requested data from the flash memory portion of the physical address space. Similarly to the first interrupt, the second interrupt may terminate the load/store request and assign a new task for the CPU in order to reduce idle CPU cycles. In certain embodiments, establishing the second interrupt may include rescheduling an interrupted software thread. As an example, if the data being searched for in flash memory by the processing thread is not found, a processing thread may be rescheduled by the first interrupt. Similarly, the second interrupt may place the processing thread (e.g., the processing thread rescheduled by the first interrupt) back in a queue for scheduling in the CPU. Other methods of managing processing threads and interrupts are also possible.

In various embodiments, aspects of the disclosure are directed toward processing an access request that includes a store instruction. Generally, a store instruction may be an operation configured to store data in the flash memory portion that does not request fetching (e.g., reading) of other data saved in memory. Accordingly, in certain embodiments, at module 481 it may be determined that the access request is a store instruction. As an example, the store instruction may be a request to save an update made to a spreadsheet. In embodiments, the store instruction may be performed and the data may be saved to one or more cache lines of the L4 cache managed by the FPGA adapter. In response to performing the store instruction to save the changes in the L4 cache, at module 482 one or more cache lines of the adapter cache may be marked with a cache-line status identifier. In embodiments, the cache lines marked with the cache-line status identifier may correspond to the cache lines in which the store instruction was performed. The cache-line status identifier may be a tag, marking, flag, or other identifier to indicate that the data store operation has been performed within the cache and has not yet been saved to the flash memory portion (e.g., the cache lines may be marked as "dirty"). Other methods of marking the cache lines are also possible.

Aspects of the disclosure relate to the recognition that, after performing the store operation and saving data in the L4 cache, it may be desirable to re-use those cache lines as part of another store operation. Accordingly, cache overflow processing module 483 may be configured to determine the physical address space of the flash memory portion that corresponds to the cache lines where the write-only operation was performed. The corresponding flash memory portion may then be checked to ascertain whether the data stored in the L4 cache has already been stored in the flash memory portion (e.g., based on whether the cache line is marked with a cache line identifier). Data saved in L4 cache lines marked with a cache line identifier may be saved to the corresponding physical address space of the flash memory portion. In response to saving the data in the flash memory portion, the cache lines of the L4 cache may be evicted and freed for future store operations. In certain embodiments, the transfer of data from the L4 cache to the flash memory and the clearing of the L4 cache lines may be synchronized such that other interrupts may be avoided. Other methods of cache and memory management are also possible.

In certain embodiments, aspects of the disclosure are directed toward processing an access request that includes a load-only instruction. Generally, a load-only instruction may be an operation configured to retrieve data from the flash memory portion that does not request storing (e.g., writing) of other data to the L4 cache or the flash memory portion. Accordingly, in embodiments, at module 484 it may be determined that the access request is a load-only instruction. As an example, the load-only instruction may be a request to retrieve an operating system file stored in flash memory. At requested data identification module 485, the load-only instruction may be analyzed to ascertain the particular data that is requested by the load-only instruction. In response to ascertaining the requested data at module 485, requested data provision module 486 may be configured to provide the requested data in response to the access request. As an example, providing the requested data may include displaying a dialogue box to a user that contains the requested data. Other methods of processing the load-only instruction are also possible.

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system for accessing flash memory, the system comprising:
a memory having a set of computer readable computer instructions, and a processor for executing the set of computer readable instructions, the set of computer readable instructions including:
establishing a physical memory address space which includes a flash memory portion;
detecting, with respect to the physical memory address space, an access request;
maintaining an adapter cache to facilitate an interface with respect to the flash memory portion of the physical memory address space;
accessing, using a load-store technique to process the access request using the adapter cache, the flash memory portion of the physical memory address space;
determining, in response to processing the access request by a field-programmable gate array adapter, that a set of requested data is not in the adapter cache;
establishing, in response to determining that the first set of requested data is not in the adapter cache, a first interrupt;
retrieving, from the flash memory portion of the physical address space, the set of requested data; and
establishing, in response to retrieving the set of requested data from the flash memory portion of the physical address space, a second interrupt.

2. The system of claim 1, wherein the access request includes a physical address which directly addresses the flash memory portion of the physical memory address space, and wherein the flash memory portion corresponds to an input-output memory range, and further comprising:
accessing, using the physical address of the access request, the input-output memory range that corresponds to one or more storage cells of the flash memory portion of the physical memory address space.

3. The system of claim 1, wherein the access request, with respect to the flash memory, is processed without a virtual memory manager file cache.

4. The system of claim 1, wherein the access request, with respect to the flash memory, is processed without a Least Recently Used (LRU) logic of an operating system.

5. The system of claim 1, further comprising: maintaining, using a field-programmable gate array adapter, the adapter cache to use cache storage to maintain data and instructions to facilitate a direct interface with respect to the flash memory portion of the physical memory address space.

6. The system of claim 1, further comprising:
determining, in response to detecting the access request, that a set of requested data is not in a central processing unit cache; and
processing, in response to determining that the set of requested data is not in the central processing unit cache, the access request by a field-programmable gate array adapter.

7. The system of claim 1, further comprising:
determining, in response to detecting the access request, that the access request is a store instruction;
marking, with a cache-line status identifier, a cache line of the adapter cache; and
processing, without an interrupt, a cache overflow operation.

8. The system of claim 1, further comprising:
determining, in response to detecting the access request, that the access request is a load-only instruction;
identifying, in the adapter cache, a set of requested data; and
providing, without an interrupt, the set of requested data in response to the access request.

9. The system of claim 1, wherein the flash memory includes a volatile memory of a physically separate computer.

10. The system of claim 1, wherein accessing flash memory includes utilizing a field-programmable gate array attachment.

11. A system for accessing flash memory, the system comprising:
a memory having a set of computer readable computer instructions, and a processor for executing the set of computer readable instructions, the set of computer readable instructions including:
establishing a physical memory address space which includes an input-output memory range that corresponds to one or more storage cells of a flash memory portion of the physical memory address space;
detecting, with respect to the physical memory address space which includes the input-output memory range that corresponds to the one or more storage cells of the flash memory portion of the physical memory address space, an access request; and
accessing, using a load-store technique to process the access request with respect to the physical memory address space, the input-output memory range that corresponds to the one or more storage cells of the flash memory portion of the physical memory address space;
establishing a physical memory address space which includes a flash memory portion;
detecting, with respect to the physical memory address space, an access request;
maintaining an adapter cache to facilitate an interface with respect to the flash memory portion of the physical memory address space;
accessing, using a load-store technique to process the access request using the adapter cache, the flash memory portion of the physical memory address space;
determining, in response to processing the access request by a field-programmable gate array adapter, that a set of requested data is not in the adapter cache;
establishing, in response to determining that the first set of requested data is not in the adapter cache, a first interrupt;
retrieving, from the flash memory portion of the physical address space, the set of requested data; and
establishing, in response to retrieving the set of requested data from the flash memory portion of the physical address space, a second interrupt.

12. The system of claim 11, further comprising:
selecting a range of discrete addresses on an address bus circuitry; and
assigning the range of discrete addresses on the address bus circuitry to the one or more storage cells of the flash memory portion of the physical memory address space.

13. The system of claim 11, further comprising:
detecting that the access request includes a physical address which directly addresses the flash memory portion of the physical memory address space.

14. The system of claim 11, wherein the flash memory includes a volatile memory of a physically separate computer.

15. The system of claim 11, wherein accessing flash memory includes utilizing a field-programmable gate array attachment.

16. The system of claim 11, further comprising:
maintaining an adapter cache to facilitate an interface with respect to the flash memory portion of the physical memory address space.

17. A system for accessing flash memory, the system comprising:
a memory having a set of computer readable computer instructions, and a processor for executing the set of computer readable instructions, the set of computer readable instructions including:
accessing, using a load-store technique to process an access request using an adapter cache, a flash memory portion of a physical memory address space;
determining that a set of requested data is not in the adapter cache; and
establishing, in response to determining that the set of requested data is not in the adapter cache, a first interrupt.

18. The system of claim 17, further comprising:
retrieving, from the flash memory portion of the physical address space, the set of requested data; and
establishing, in response to retrieving the set of requested data from the flash memory portion of the physical address space, a second interrupt.

19. The system of claim 18, further comprising:
establishing the physical memory address space which includes an input-output memory range that corresponds to one or more storage cells of the flash memory portion of the physical memory address space;
detecting, with respect to the physical memory address space which includes the input-output memory range that corresponds to the one or more storage cells of the flash memory portion of the physical memory address space, the access request; and
accessing, using the load-store technique to process the access request with respect to the physical memory address space, the input-output memory range that corresponds to the one or more storage cells of the flash memory portion of the physical memory address space.

* * * * *